(12) United States Patent
Gilham

(10) Patent No.: US 6,308,165 B1
(45) Date of Patent: Oct. 23, 2001

(54) METHOD OF AND APPARATUS FOR GENERATING AND AUTHENTICATING POSTAL INDICIA

(75) Inventor: Dennis Thomas Gilham, Stock (GB)

(73) Assignee: Neopost Limited, Essex (GB)

( * ) Notice: Subject to any disclaimer, the term of this patent is extended or adjusted under 35 U.S.C. 154(b) by 0 days.

(21) Appl. No.: 09/031,744

(22) Filed: Feb. 27, 1998

(30) Foreign Application Priority Data

Feb. 28, 1997 (GB) .................................................. 9704159

(51) Int. Cl.⁷ ...................................................... G06F 17/00
(52) U.S. Cl. ................................................................ 705/62
(58) Field of Search ........................... 705/410, 1, 405, 705/60, 62, 408, 401; 380/51

(56) References Cited

U.S. PATENT DOCUMENTS

| | | | |
|---|---|---|---|
| 4,725,718 | 2/1988 | Sansone et al. | 235/495 |
| 4,743,747 | 5/1988 | Fougere et al. | 235/494 |
| 4,813,912 | 3/1989 | Chickneas et al. | 705/408 |
| 5,142,557 | 8/1992 | Toker et al. | 378/37 |
| 5,390,251 | 2/1995 | Pastor et al. | 705/62 |
| 5,586,036 | 12/1996 | Pintsov | 705/408 |
| 5,666,421 | 9/1997 | Pastor et al. | 380/51 |
| 5,799,290 * | 8/1998 | Dolan et al. | 705/410 |
| 5,805,701 * | 8/1998 | Ryan, Jr. | 380/21 |

FOREIGN PATENT DOCUMENTS

| | | |
|---|---|---|
| 0 360 225 | 3/1990 | (EP) . |
| 2 211 644 A | 7/1989 | (GB) . |
| 97/40472 | 10/1997 | (WO) . |

OTHER PUBLICATIONS

Brakeman, Lynne; Proposed electronic postage system features 2D code; May 1997; Automatic I.D. News p1; Dialog Web copy pp. 1–3.*
International Search Report.

* cited by examiner

Primary Examiner—James P. Trammell
Assistant Examiner—Thomas A. Dixon
(74) Attorney, Agent, or Firm—Shoemaker and Mattare, Ltd

(57) ABSTRACT

Methods and apparatus for authentication of postage indicia are disclosed. A secret key is read from store and modified in dependence upon postage data to be printed in a postage indicium. The modified key is then utilized to generate an authentication code dependent upon the postage data to be printed. Authentication of the indicium is effected by reading the authentication code and postage data from the printed indicium and repeating the process of generating an authentication code. The generated authentication code is compared with the authentication code read from the indicium. A control code based on a value in an accounting register may be included in the indicium. The value may be a value of postage dispensed in a determined expired period.

3 Claims, 3 Drawing Sheets

1*123456*43657*8*1*42
30  31    32   33 34 35

METHOD OF AND APPARATUS FOR GENERATING AND AUTHENTICATING POSTAL INDICIA

BACKGROUND OF THE INVENTION

This invention relates to postage indicia printed on mail items and to the provision of security and authentication of said indicia.

Postage meters have been utilised over a long period to print postage indicia on mail items, the postage indicia indicating that postage has been applied to the mail item and that accounting has been effected in respect of the applied postage. Known postage meters include an electronic circuit for carrying out accounting functions in relation to amounts of postage charges applied to mail item. The electronic circuit receives an input of a desired postage charge to be applied to a mail item, carries out accounting in respect of the required postage charge and then operates a printer of the postage meter to print a postage indicium on the mail item. Generally the postage indicium includes at least the postage charge, the date on which the indicium is printed and an identification of the postage meter.

Previously, the printer of the postage meter comprised a rotatable drum printer in which a die plate carried by the drum printed fixed invariable information of the indicium and settable print wheels carried by the drum printed variable information of the indicium. The fixed invariable information comprises a graphical pattern, a meter identification number and the originating postal region for the mail. The variable information comprises an amount of the postage charge and the date of printing the indicium.

The postage meter is constructed in a secure manner by being housed in a secure housing and the printing means which prints the indicium is constructed to work integrally with the meter and also is secure. Accordingly the indicia is printed under conditions of security and attempts to operate the meter and printer in a fraudulent manner in which indicia are printed in respect of postage amounts for which accounting has not been effected are prevented.

However in order to provide additional security with respect to the postage amounts applied to mail items it is desirable that the indicia on the mail items include authenticating information whereby the authenticity of the indicia can be verified. By including this authenticating information it is possible, by examination of indicia on mail items, to detect indicia which are not genuine and purport to represent postage charges. No accounting for the postage charges represented by such non-genuine indicia will have been effected so that such indicia have been produced in a manner which results in fraud on the postal authority or other carrier.

Postage meters currently available are provided with a digital printer in place of the drum printer. The digital printer is controlled by the electronic circuit of the postage meter to print in a series of cycles a pattern of dots to form the complete indicium. It will be appreciated that, whereas the indicium printed by the drum printer of earlier postage meters is invariable apart from the value of postage charge and date, the digital printer of currently available postage meters is capable of printing an indicium containing significantly more variable information. Due to the increased flexibility and capability of digital printers as compared with drum printers it is possible to print additional information in the indicium which can be utilized to authenticate the indicium whereby indicia printed in an unauthorized manner can be recognised and differentiated from indicia printed in an unauthorized manner by an unauthorized postage meter.

SUMMARY OF THE INVENTION

According to a first aspect of the invention a method of generating an indicium for printing on an item includes the steps of storing a key; generating a modified key from the stored key in dependence upon first data to be included in said indicia; utilizing the modified key in conjunction with second data to be included in the indicia to generate an authentication code and printing the indicium, said indicium including said first and second data and said authentication code.

According to a second aspect of the invention a method of authenticating an indicium including data and an authentication code for authentication of said data includes the steps of selecting a stored key; utilizing said data to generate a modified key from said stored key; utilizing said modified key and said data to generate an authentication code and comparing the generated authentication code with the authentication code included in the indicium.

According to a third aspect of the invention postage meter apparatus includes means storing a secret key; input means for the input of postage data; electronic control means operative to read the secret key and to modify the secret key to generate a modified secret key in dependence upon and the postage data, said electronic control means being operative to utilize the modified secret key to generate an authentication code dependent upon the postage data and being operative to print an indicium containing the postage data and the authentication code.

According to a fourth aspect of the invention a postage meter includes a register storing a value of postage dispensed by the postage meter in a determined period and means to generate a control value dependent upon the value stored in said register and to include a code value dependent upon the control value in an indicium printed on a mail item.

BRIEF DESCRIPTION OF THE DRAWINGS

An embodiment of the invention will be described by way of example with reference to the drawings in which.

DESCRIPTION OF THE PREFERRED EMBODIMENT

Figures 1, 2:
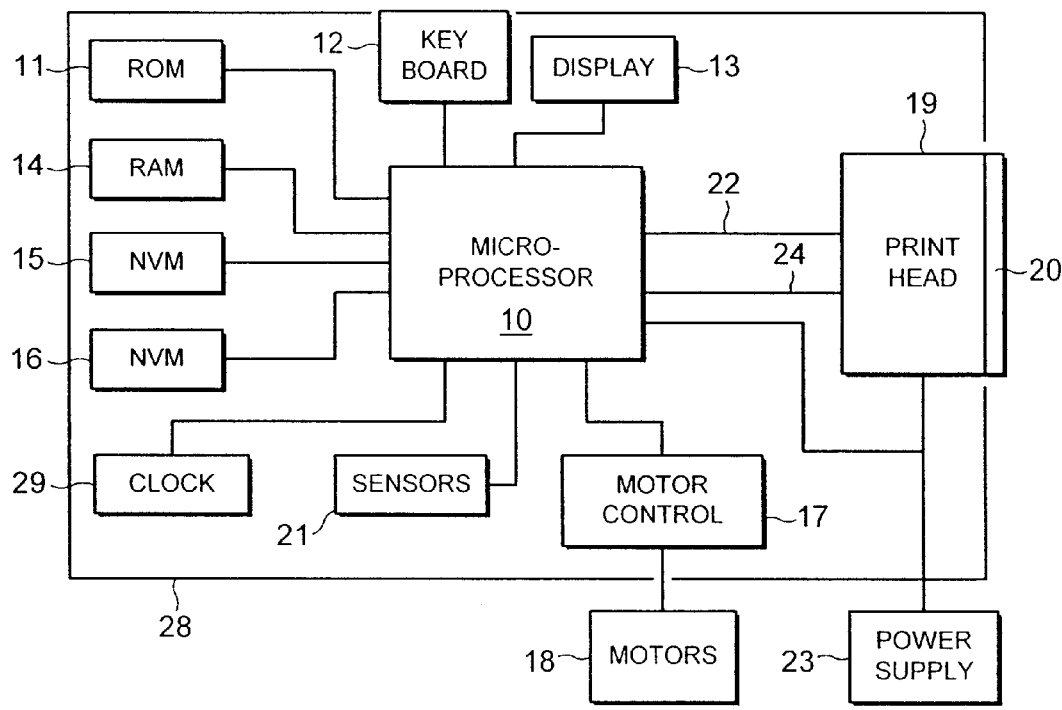
FIG. 1 is a block diagram of a postage meter
FIG. 2 illustrates machine information included in an indicium printed on a mail item.

Referring first to FIG. 1 of the drawings, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to use of the postage meter and which is required to be retained even when the postage meter is not powered. The microprocessor 10 carries out accounting functions in relation to use of the postage meter for franking mail items with amounts of postage charges applicable to handling of the mail items by the postal authority or another carrier. Accounting data relating to use of the postage meter for printing franking indicia representing postage charges for mail items and any other critical data to be retained is stored in the non-volatile memories 15, 16. The accounting data includes a value of credit, an accumulated total of value used by the meter in franking mail items, a count of the number of mail items franked by the meter and a count of the number of mail items franked with a postage charge in excess of a predetermined value. The value of credit may be a value of credit available for use by the meter and stored in a descending credit register. The accumulated total value used by the meter is stored in an ascending tote register, the count of items is stored in a piece count register and the count of items franked with a postage charge in excess of a predetermined value is stored in a large items register. Alternatively, if desired, instead of a descending register storing a value of credit available for use by the meter, a total value of credit entered into the meter may be stored in an ascending credit register.

As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 15, 16.

A motor controller 17 is controlled by the microprocessor 10 to control operation of motors 18 driving feeding means (not shown) for feeding a mail item past a digital print head 19. The digital print head 19 may be an impact print head in which print elements are impelled selectively to impact with an ink ribbon to transfer ink to a mail item or any other form of digital print head and for example may be a non-impact print head. It is preferred to use a non-impact print head such as a thermal print head operating as described hereinafter. The thermal print head includes a plurality of selectively energisable thermal printing elements 20. Sensors 21 are provided to sense and monitor feeding of the mail item. The sensors provide signals to the microprocessor to enable the microprocessor to control feeding of the mail item and to energize selectively the thermal print elements 20 of the print head at appropriate times as the mail item is fed past the print head. As the mail item is fed past the thermal printing elements 20 of the print head 19 during a printing operation, the microprocessor outputs on line 22, in each of a series of printing cycles, print data signals selecting those ones of the printing elements 20 which are to be energized in each respective printing cycle. A pulse of electrical power is supplied to the selected thermal printing elements from a power source 23 when a strobe signal is supplied by the microprocessor on a line 24 to the print head. When printing a bar-code, a plurality of adjacent thermal printing elements are energized in selected printing cycles such as to print narrow and wide bars as required to represent data. The bars may all be of the same length in which case the same number of thermal printing elements are energized in each of the selected printing cycles. However when it is desired to print bars of selected different lengths, the number of thermal printing elements energized in each selected printing cycle is selected to correspond to the required length of bar to be printed.

It will be appreciated, as is well known in the postage meter art, that the postage meter must operate in a secure manner and be protected from attempts to use the meter fraudulently for example by utilizing the postage meter to print franking indicia on mail items for which no corresponding postage charge has been accounted for by the accounting means. Accordingly those parts of the postage meter required to be secured against unauthorized tampering are housed in a secure housing 28.

In so-called prepayment operation of a postage meter, each time a franking operation is to be performed, the micro-processor carries out a routine in which a determination is made as to whether the value of credit in the credit register is sufficient to permit the franking operation in respect of the required postage charge for a mail item to be performed. If the value of credit in the credit register is sufficient, the franking operation is continued and the accounting data in the registers is updated to account for the postage charge and the franking indicia is printed. However if the value of credit in the credit register is not sufficient to permit the franking operation in respect of the required postage charge to be performed, the operation is terminated and the franking indicia is not printed. Where a value of credit available for use in franking is stored in a descending register, the check as to sufficiency of the credit available is effected by a determination of whether the postage charge is less than the credit value. Where a total value of credit is stored in an ascending credit register the check as to sufficiency of credit is effected by a determination of whether the total value of credit is at least equal to the sum of the postage amount and the accumulated total value in the tote register.

In addition to the security against fraudulent attempts to print postage indicia on mail items provided by the secure construction of the postage meter, additional security in respect of the postage indicia and for the postage amounts represented is provided by authentication data included in the indicia. The authentication data to be printed in the indicia is encrypted. The postage data together with the encrypted authentication data information is printed on the mail item. The encryption of the data is effected using an algorithm and a secret key so that the encrypted information is not predictable from the data printed in the indicia. The validity of an indicium can be verified by carrying out the same encryption of the printed data and then comparing the resultant encrypted information with the encrypted information printed on the mail item. If the comparison is successful validity of the indicium is verified whereas if the comparison is not successful the indicium is regarded as not authentic. The process for generation of the encrypted information, if desired, may be a reversible encryption process whereby the encrypted information can be decrypted to yield the original data. When a reversible encryption process is used, verification of the indicium may be effected by decrypting the encrypted information printed in the indicium and comparing the decrypted information with the original data. Instead of utilizing encrypted information for verification of the authenticity of the indicium a digital signature may be used.

To facilitate verification of the validity of the indicia it is desirable that the data and encrypted information or digital signature in the indicia is of a form which is machine readable. Accordingly the mail items can be fed through reading means to scan the indicia on the mail items and computing means coupled to the reading means carries out verification checks on the scanned indicia. Conveniently the postage data and encrypted authentication data are printed in a form suitable for optical character recognition or may be printed in the form of a bar-code. In addition to the machine readable information, the indicium may contain information in human readable form.

Referring now to FIG. 2 of the drawings, the figure illustrates an example of a format of postage data items and encrypted information in a machine readable part of an indicium. The machine readable part of the indicium includes postage data comprising a meter vendor's or meter manufacturer's identification 30 provided by a single digit, a postage meter identification 31 provided by six digits, a piece count 32 of the number of mail items processed by the postage meter provided by five digits, a date representation 33 provided by a single digit, a postage amount 34 represented by a single digit and also includes a mail authentication code 35 of two digits comprising an encryption of authentication data. If desired the order of the items of data may be changed and the encrypted authentication data 35 may be a digital signature instead of encrypted information. The representation of date by a single digit and the representation of postage amount by a single digit is described in our pending application GB 9623936.3 . The '*' symbols are used in the figure to separate the various items of data in the indicia. However in practice if desired these symbols may be omitted or replaced by other means the only requirement being that each data item can be distinguished from a neighbouring data item.

Figure 3:
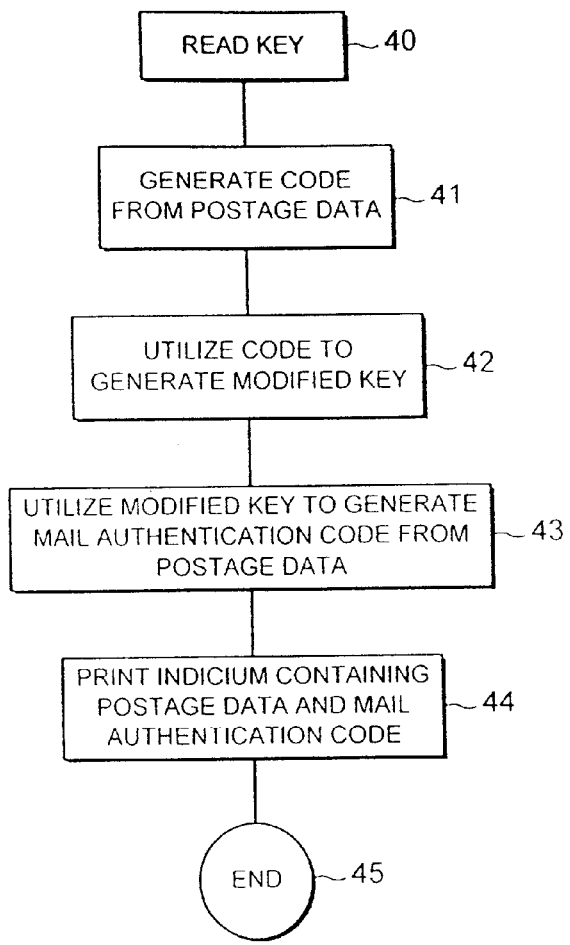
FIG. 3 is a flow chart illustrating steps carried out in generating authentication information to be printed in the indicium

Referring to the flow chart of FIG. 3, the microprocessor of the postage meter reads (step 40) a secret key stored in the non-volatile memory 15, 16 and then modifies the secret key in a modification process. The modification of the secret key is effected in dependence upon a code generated (step 41) from data to be printed in the machine readable part of the indicium. A code number which may be a check digit or check digits is generated (step 41) from at least a part of the postage data and the code number is utilized in conjunction with an algorithm or look-up table to generate (step 42) a modified secret key. Thus the modified secret key will be unpredictable for each mail item and will vary in a random manner dependent upon the postage data. The modified secret key is then utilized (step 43) with an algorithm to operate on at least a part of the postage data to generate the machine authentication code. Then an indicium containing the postage data and authentication code is printed (step 44) on the mail item and the routine in respect of that mail item ends (END 45).

Figure 4:
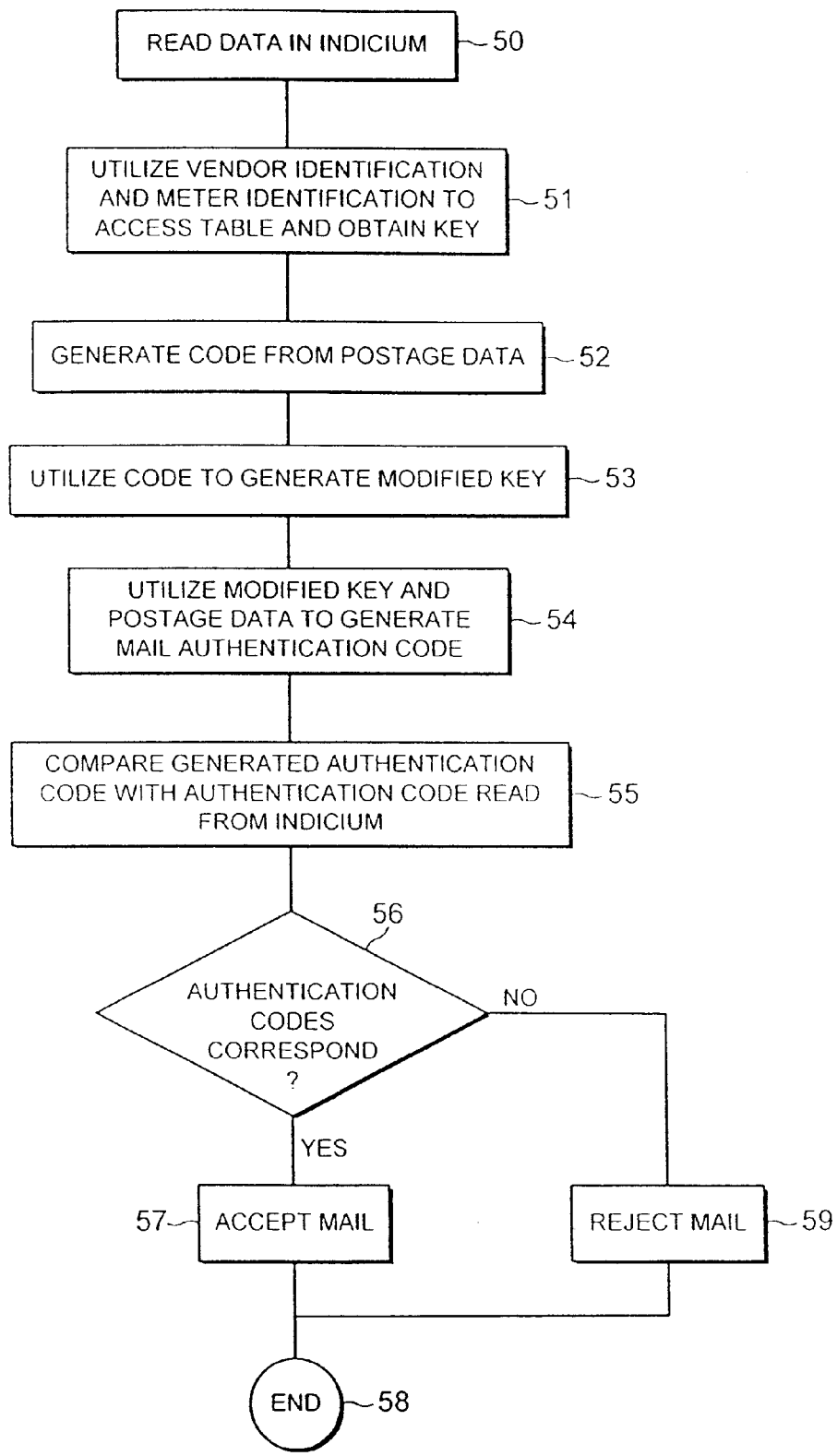

Referring to the flow chart of FIG. 4, when the mail item bearing a postage indicia including the machine readable part is received by a postal authority, the machine readable data is read (step 50) by a machine reading device such as a scanner and the output of the scanner is input to a postal authority computer. The computer utilizes (step 51) the vendor identification 30 and the postage meter identification 31 to access a look-up table to determine the secret key appropriate to the postage meter that printed the indicia on the received mail item. The computer then modifies the secret key in dependence upon a code generated in dependence upon the postage data read from the mail item, in the same manner as the postage meter generated the modified secret key, to generate a modified key corresponding to the modified secret key generated by the postage meter. Thus the computer generates (step 52) the code from the postage data and utilizes the code to generate (step 53) the modified secret key. The computer,then utilizes (step 54) the modified secret key with an algorithm to operate on the code generated from the postage data, in the same manner as the postage meter, to generate the mail authentication code 35. The computer then compares (step 55) the authentication code generated in step 54 with the authentication code read from the mail item. If the mail authentication code generated by the computer corresponds (YES output of step 56) to the mail authentication code read in the machine readable part of the indicia printed on the mail item the postage indicia is authenticated and is genuine and the mail item is accepted (step 57). The authentication of the indicium for that mail item then ends (END 58). However if the mail authentication code generated by the computer does not correspond (NO output of step 56) to the mail authentication code read from the indicia, the indicia is not authenticated and is not genuine. The computer then operates to reject (step 59) the mail item as bearing an indicia which has been printed in a fraudulent manner and checking authentication of the indicium on that mail item ends (END 58). It will be appreciated that if the postage meter utilizes only a part of the postage data to generate the code to modify the key and only a part of the postage data to generate the authentication code, the computer utilizes the same part or parts of the postage data in generating the code to modify the key and to generate the authentication code.

Figure 5:
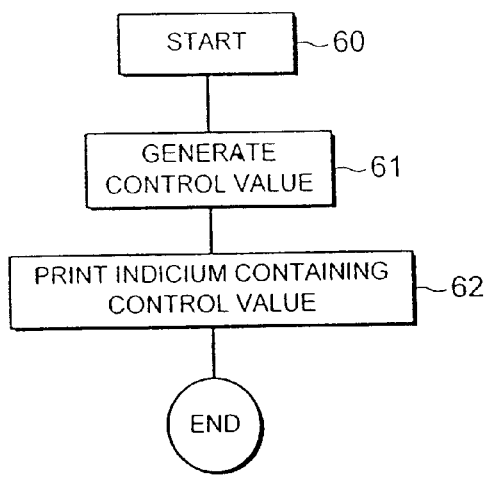
FIG. 4 is a flow chart illustrating steps in authenticating a printed indicium and FIG. 5 is a flow chart illustrating additional or alternative steps carried out in printing a postage indicium.

Instead of modifying the key as described hereinbefore, or in addition to modifying the key, the data printed in the machine readable part of the indicium may include a control value dependent upon the accumulated value in the ascending register of postage dispensed by the meter and the credit value in the credit register and, for example, the control value may be dependent upon the sum of the accumulated value and the credit value. The control value may be equal to the sum of the accumulated value and credit value or may be derived from this sum. A routine, or a sub-routine to be incorporated in the routine illustrated by FIG. 3, for printing an indicium containing a control value is illustrated by the flow chart of FIG. 5. After initiation (START 60) of the routine or sub-routine, the control value is generated (step 61) and the indicium is printed (step 62), the indicium containing the control value. If desired, where the steps of FIG. 5 are a sub-routine, the sub-routine may be carried out between steps 43 and 44 of the flow chart of FIG. 3.

The postage meter may be provided with registers in the non-volatile memories 15, 16 which store monthly totals of postage dispensed by the meter. For example, there may be two such registers, one storing the amount of postage dispensed to date in a current period and which will continue to be incremented as postage is dispensed until the end of the current period and the other register storing the amount of postage dispensed in the period immediately preceding the current period. The start and finish of each period is determined by a real time clock 29 communicating with the microprocessor 10. Conveniently each of the periods may be equal to one month. Instead of the control value being dependent upon the sum of the accumulated tote value and the credit value, the control value may be dependent upon the values stored in one or both of these two registers. For example the control value may be a check digit relating to the register storing the postage value dispensed in the preceding period or may be a range indicator related to an amount of postage predicted to be dispensed by the postage meter. The range indicator may be based on the amount of postage dispensed in the preceding period.

It is preferred that the indicia printed on the mail item contains all the postage data required to enable authentication of the indicia at the postal authority. However, postage meters are subject to inspection at predetermined intervals either by physically taking the meter to the postal authority or by remote inspection via a communication link and in the course of such inspections data is read from the registers of the meter. Accordingly one or more items of postage data additional to those included in the postal indicia printed on the mail item may be communicated to the postal authority during each said inspection of the postage meter and these additional items of data may be utilized by the postal authority computer in authentication of the indicia printed on the mail items.

What is claimed is:

1. A method of generating postal indicia for a series of mail items, said postal indicia each including postage data and an authentication code; including the steps of:

determining a period of time;

storing a value relating to postage charges dispensed in said period of time;

including said value in said postage data;

storing a secret key;

utilizing said secret key and first postage data relating to a first mail item to generate a first modified key relating specifically to said first mail item;

utilizing said first modified key and said first postage data to generate a first authentication code;

printing said first postage data and said first authentication code as a first postal indicium on said first mail item;

utilizing said secret key and second postage data relating to a second mail item next succeeding the first mail item to generate a second modified key, different from said first modified key, relating specifically to said second mail item;

utilizing said second modified key and said second postage data to generate a second authentication code; and printing said second postage data and said second authentication code as a second postal indicium on said second mail item wherein the step of utilizing the secret key and the first postage data to generate the first modified key includes the step of generating a first control code based on the first postage data and utilizing the secret key and the first control code to generate the first modified key and wherein the step of utilizing the secret key and the second postage data to generate the second modified key includes the step of generating a second control code based on the second postage data and utilizing the secret key and the second control code to generate the second modified key.

2. Postage meter apparatus including:

memory means storing a secret key;

electronic control means;

input means operable to input postage data relating to a specific mail item to said electronic control means;

said electronic control means being responsive to said secret key and to said postage data to generate a modified key dependent upon at least a part of said postage data and associated specifically with said mail item;

clock means operative to determine first and second consecutive time periods;

a first register storing a first value of postage dispensed in said first time period;

a second register storing a second value of postage dispensed in said second time period; and wherein the electronic control means is responsive to the modified key, to the postage data and to said first and second values of postage dispensed respectively in said first and second time periods to generate an authentication code dependent upon the postage data and the first and second values of postage dispensed and to print a postal indicium containing the postage data and the authentication code on the mail item.

3. Postage meter apparatus as claimed in claim 2 wherein the first time period is an unexpired current period of time and the second time period is an expired period of time immediately preceding said first time period.

* * * * *